United States Patent Office 3,047,573
Patented July 31, 1962

3,047,573
N-ALKYLAMIDO SUBSTITUTED
1,3-BENZOXAZINES
Torizo Takahashi, Kikuo Ogiu, Hajime Fujimura, Isao Satoda, Tomijiro Fukui, and Yasuo Yamamoto, all of Kyoto, Japan, assignors to Nippon Shinyaku Co., Ltd., Kyoto, Japan, a corporation of Japan
No Drawing. Filed June 7, 1960, Ser. No. 34,381
Claims priority, application Japan July 1, 1959
4 Claims. (Cl. 260—244)

The present invention relates to salicylic acid derivatives having the formula:

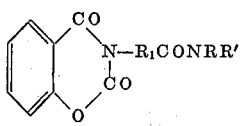

in which $R_1$ is alkylene and R and R' are each selected from the group consisting of a hydrogen atom and a hydrocarbon radical or R and R' together form a ring with N.

All of these derivatives are new compounds not described in the literature and are useful as drugs since they possess excellent analgesic activity.

For example, the pharmacological properties of 2,4-dioxodihydro-1,3-benzoxazinyl-(3) - acetodimethylamide (I) (Example 1 of this application) and its diethylamide (II) (Example 2 of this application) were compared with salicylamide, with the following results:

|  | $LD_{50}$ | $ED_{50}$ | Therapeutic Index ($LD_{50}/ED_{50}$) |
|---|---|---|---|
| Compound I | 6.2 | 0.23 | 27.0 |
| Compound II | 5.1 | 0.35 | 14.6 |
| Salicylamide | 7.0 | 1.8 | 3.9 |

Thus, the compounds of the present invention exhibit superior therapeutic activity as compared to a known similar compound, and are very useful as drugs.

The compounds of the present invention may, in general, be manufactured by the reaction of 2,4-dioxodihydro-1,3-benzoxazine (a metal salt thereof is preferred) with a compound of the formula $XR_1CONRR'$ and may be represented as follows when the starting material is the sodium salt:

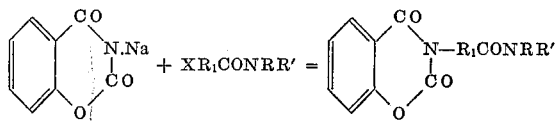

In the above formulas, X is halogen, e.g., chlorine or bromine, and the meanings of the other symbols are the same as already mentioned.

In carrying out the above process, it is preferred to use an alkali metal salt of the starting material (2,4-dioxodihydro-1,3-benzoxazine) such as the sodium or potassium salt. The reaction may, in general, be smoothly carried out by heating and using a solvent such as water or alcohol. It can, however be carried out without the use of a solvent. Temperature and time of the reaction may be varied according to the property of the product desired as fully described in the following examples. The reaction may also be carried out very smoothly in the presence of sodium iodide.

The invention is illustrated by the following non-limitative examples:

EXAMPLE I

*2,4-Dioxodihydro-1,3-Benzoxazinyl-(3) Acetodimethylamide*

A mixture of 86 grams of 2,4-dioxodihydro-1,3-benzoxazine (Na salt) and 65 grams of chloroacetic dimethylamide was refluxed in 40 ml. ethanol in the presence of 5 grams of sodium iodide for 7 hours, cooled, and the separated crystals washed with water and alcohol to give 100 grams (85.5%) of the desired product. This was purified by recrystallization from methanol, ethanol, or benzene. Analysis calculated as $C_{12}N_{12}N_2O_4$ (248.25): C 58.06%, H 4.87%, N 11.29%. Found: C 57.75%, H 4.85%, N 11.55%.

The above reaction may be carried out using water or methanol instead of ethanol. When a solvent is not used, the desired product can be obtained when the reaction system is heated at 130° C. Instead of using the sodium salt of 2,4-dioxodihydro-1,3-benzoxazine as the starting material, a mixture of 2,4-dioxodihydro-1,3-benzoxazine and sodium hydroxide, alkali carbonate, or sodium alcoholate may be used.

EXAMPLE II

*2,4-Dioxodihydro-1,3-Benzoxazinyl-(3)-Acetodiethylamide*

A mixture of 20 grams of the sodium salt of 2,4-dioxodihydro-1,3-benzoxane and 18 grams of chloroacetic diethylamide was heated in 120 ml. ethanol in the presence of 1 gram of sodium iodide for 10 hours and then treated the same as in the preceding example to give 21 grams (82%) of the desired product of M. Pt. 146–7° C. This was purified by recrystallization from alcohol. Analysis calculated at $C_{14}H_{16}N_2O_4$ (276.28): C 60.86%, H 5.84%, N 10.14%. Found: C 60.74%, H 5.86%, N 10.24%.

EXAMPLE III

*α-(2,4-Dioxodihydro)-1,3-Benzoxazinyl-(3)-Propionic Dimethylamide*

A mixture of 10 grams of the sodium salt of 2,4-dioxodihydro-1,3-benzoxazine and 20 grams of α-bromopropionic dimethylamide was heated at about 130° C. for 6 hours and cooled. To the separated mass was added a small amount of benzene, cooled, and the separated crystals were washed with water, dried, and recrystallized from benzene or from benzene-n-hexane to give 8.5 grams (60%) of the desired product of M. Pt. 123–4° C. Analysis calculated at $C_{11}H_{10}N_4O_2$ (262.26): C 59.53%, H 5.38%, N 10.68%. Found: C 59.76%, H 5.34%, N 10.71%.

EXAMPLE IV

*2,4-Dioxodihydro-1,3-Benzoxazinyl-(3)-Acetomonomethylamide*

A mixture of 16.5 grams of the sodium salt of 2,4-dioxodihydro-1,3-benzoxazine and 10 grams of chloroacetic monomethylamide in 75 ml. ethanol was heated in the presence of 1 gram of sodium iodide for 10 hours, cooled, and the separated crystals were washed with water and recrystallized from alcohol to give 14.5 grams (75%) of the desired product of M. Pt. 248° C. Analysis calculated as $C_{11}H_{10}O_4N_2$ (234.21): C 56.41%, H 4.30%, N 11.96%. Found: C 56.55%, H 4.36%, N 12.11%.

EXAMPLE V

*2,4-Dioxodihydro-1,3-Benzoxazinyl-(3)-Acetopiperidide*

A mixture of 20 grams of the sodium salt of 2,4-dioxodihydro-1,3-benzoxazine and 20 grams of chloroacetic piperidide in 100 ml. ethanol was heated in the presence of 2 grams of sodium iodide for 6 hours, cooled, and the separated crystals were washed with water and recrystallized from alcohol to give 22.5 grams (73%) of the desired product of M. Pt. 141–2° C. Analysis calculated as $C_{15}H_{16}O_4N_2$ (288.29): C 62.49%, H 5.59%, N 9.72%. Found: C 62.61%, H 5.48%, N 9.75%.

EXAMPLE VI

*2,4-Dioxodihydro-1,3-Benzoxazinyl-(3)-Acetomorpholide*

A mixture of 20 grams of the sodium salt of 2,4-dioxodihydro-1,3-benzoxazine and 20 grams of chloroacetic morpholide was heated in 100 ml. alcohol in the presence of 2 grams of sodium iodide for 7 hours cooled and the separated crystals were washed with water and recrystallized from alcohol or from chloroform-hexane to give 29.5 grams (94%) of the desired product as plates of M. Pt. 239–41° C. Analysis calculated as $C_{14}H_{14}O_5N_2$ (290.27): C 57.93%, H 4.86%, N 9.65%. Found: C 57.95%, H 4.94%, N 9.72%.

What is claimed is:

1. A salicylic acid derivative of the formula:

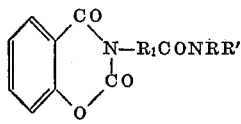

in which $R_1$ is $CH_2$ and R and R' are each selected from the group consisting of methyl and ethyl.

2. 2,4 - dioxodihydro - 1,3 - benzoxazinyl - (3) - acetodimethylamide.

3. 2,4-dioxodihydro-1,3-benzoxazinyl-(3) - acetodiethylamide.

4. The method of preparing the salicylic acid derivatives of claim 1 which comprises heating the sodium salt of 2,4-dioxodihydro-1,3-benzoxazine with a compound of the formula $XR_1CONRR'$, in which $R_1$ is $CH_2$ and R and R' are each selected from the group consisting of methyl and ethyl.

References Cited in the file of this patent

UNITED STATES PATENTS

| | | |
|---|---|---|
| 2,476,559 | Nawiasky et al. | July 19, 1949 |
| 2,714,105 | Wright | July 26, 1955 |
| 2,835,668 | Shapiro et al. | May 0, 1958 |
| 2,855,436 | Rekker | Oct. 7, 1958 |